United States Patent
Akiyama et al.

(10) Patent No.: US 9,169,803 B2
(45) Date of Patent: Oct. 27, 2015

(54) SEAL MEMBER, AND PLUG TUBE SEAL STRUCTURE FOR ENGINE

(75) Inventors: Yoshihiro Akiyama, Saitama (JP); Shinichi Musha, Tokyo (JP)

(73) Assignees: HONDA MOTOR CO., LTD., Tokyo (JP); MAHLE FILTER SYSTEMS JAPAN CORPORATION, Tokyo (JP)

( * ) Notice: Subject to any disclaimer, the term of this patent is extended or adjusted under 35 U.S.C. 154(b) by 0 days.

(21) Appl. No.: 14/110,107

(22) PCT Filed: Apr. 2, 2012

(86) PCT No.: PCT/JP2012/058885
§ 371 (c)(1),
(2), (4) Date: Oct. 4, 2013

(87) PCT Pub. No.: WO2012/137718
PCT Pub. Date: Oct. 11, 2012

(65) Prior Publication Data
US 2014/0020647 A1    Jan. 23, 2014

(30) Foreign Application Priority Data
Apr. 6, 2011  (JP) .................. 2011-084156

(51) Int. Cl.
*F02F 1/00* (2006.01)
*F02F 11/00* (2006.01)
(Continued)

(52) U.S. Cl.
CPC ............. *F02F 11/002* (2013.01); *F16J 15/025* (2013.01); *F16J 15/062* (2013.01); *H01T 13/08* (2013.01); *F02F 7/006* (2013.01)

(58) Field of Classification Search
CPC ........... H01T 13/08; F02P 13/00; F02F 1/242

USPC ......... 123/193.2, 193.5, 193.4, 188.1, 188.5, 123/190.17, 188.7
See application file for complete search history.

(56) References Cited

U.S. PATENT DOCUMENTS

| 4,727,833 A | * | 3/1988 | Nakashima ................ 123/195 C |
| 5,662,095 A | * | 9/1997 | Matsuo ...................... 123/143 C |

(Continued)

FOREIGN PATENT DOCUMENTS

| CN | 1993577 A | 7/2007 |
| DE | 249732 A1 | 6/1976 |

(Continued)

OTHER PUBLICATIONS

European Search Report issued Sep. 17, 2014; Application No. 12768118.7.

(Continued)

*Primary Examiner* — Lindsay Low
*Assistant Examiner* — Long T Tran
(74) *Attorney, Agent, or Firm* — Arent Fox LLP

(57) ABSTRACT

A seal member (3) is disposed between a cylinder head cover (1) in which an ignition plug mounting hole (1a) is formed and a plug tube (2) which is inserted in the ignition plug mounting hole (1a). The seal member (3) is provided with: a base section (31) configured to be elastically deformable and inserted into the ignition plug mounting hole (1a); a protrusion section (32) formed so as to protrude outward in the radial direction from the outer peripheral surface of the base section (31) and engaging with a groove (12b) formed in the inner peripheral surface of the ignition plug mounting hole (1a); a seal lip section (33) in elastic contact with the outer peripheral surface of the plug tube (2); and a grip section (34) formed between the base section (31) and the seal lip section (33) and protruding downward from the ignition plug mounting hole (1a).

8 Claims, 9 Drawing Sheets

(51) Int. Cl.
  *F16J 15/02*  (2006.01)
  *F16J 15/06*  (2006.01)
  *H01T 13/08*  (2006.01)
  *F02F 7/00*  (2006.01)

(56) References Cited

U.S. PATENT DOCUMENTS

| | | | |
|---|---|---|---|
| 6,390,042 B1 * | 5/2002 | Scott et al. | 123/90.17 |
| 6,702,293 B2 * | 3/2004 | Endo et al. | 277/500 |
| 7,854,433 B2 * | 12/2010 | Berdichevsky | 277/561 |
| 2008/0036159 A1 | 2/2008 | Yanagi | |
| 2011/0247600 A1 * | 10/2011 | Anzo et al. | 123/634 |

FOREIGN PATENT DOCUMENTS

| | | |
|---|---|---|
| DE | 2459732 A1 | 6/1976 |
| JP | H05-87253 U | 11/1993 |
| JP | 07-23861 U | 5/1995 |
| JP | 2001-263159 A | 9/2001 |
| JP | 2003-35365 A | 2/2003 |
| JP | 2005-155455 A | 6/2005 |
| JP | 2007-85414 A | 4/2007 |
| JP | 2007-120440 A | 5/2007 |
| JP | 1993577 A | 7/2007 |
| JP | 2007-321605 A | 12/2007 |
| JP | 4198708 B2 | 12/2008 |

OTHER PUBLICATIONS

CD-ROM of the specification and drawings annexed to the request of Japanese Utility Model Application No. 59398/1993 (Laid-open No. 23861/1995), NOK Corp., May 2, 2005, entire text & all drawings.
International Search Report and Written Opinion issued in PCT/JP2012/05885, dated Jun. 19, 2012, 7 pages.

* cited by examiner

SEAL MEMBER, AND PLUG TUBE SEAL STRUCTURE FOR ENGINE

CROSS REFERENCE TO RELATED APPLICATIONS

This application is a National Stage entry of International Application No. PCT/JP2012/058885, filed Apr. 2, 2012, which claims priority to Japanese Application No. 2011-084156, filed Apr. 6, 2011. The disclosures of the prior applications are hereby incorporated in their entirety by reference.

TECHNICAL FIELD

The present invention relates to a seal member, and a plug tube seal structure for an engine.

BACKGROUND ART

Conventionally, a cylinder head cover is provided with a spark plug fitting hole for inserting a plug tube in which a spark plug is housed. Further, a seal member is arranged between the inner circumferential surface of the spark plug fitting hole and the outer circumferential surface of the plug tube, wherein sealing with airtightness and liquid tightness is made between the cylinder head cover and the plug tube.

For example, Patent Document 1 discloses an invention wherein there are provided a cylinder head cover having a flange portion protruding from the lower part of the inner circumferential surface of a spark plug fitting hole inward along the axial direction, a plug tube inserted in the spark plug fitting hole, and an annular seal member disposed between the cylinder head cover and the plug tube, pressure fitted inside the spark plug fitting hole, and supported by and in contact with the upper surface of the flange portion.

BACKGROUND ART DOCUMENT

Patent Document

Patent Document 1: Japanese Patent No. 4198708

DISCLOSURE OF THE INVENTION

Problem to be Solved by the Invention

However, by the invention disclosed in Patent Document 1, as the seal member is pressure-fitted in the spark plug hole, in removing the seal member from the cylinder head cover, it is necessary to forcibly remove the seal member from the cylinder head cover, using a tool, which requires a lot of work for removing the seal member.

The present invention has been developed in this point of view, and an object of the invention is to provide a seal member and a plug tube seal structure for an engine, which improve the work efficiency in removing the seal member.

Means for Solving the Problem

In order to solve the above-described problems, according to the invention, provided is a seal member that is elastically deformable, fitted to a fitting hole formed through a base member, and disposed between a cylindrical member inserted in the fitting hole and the base member, the seal member including: a base portion inserted in the fitting hole; a first engaging portion that is formed protruding outward in a radial direction from an outer circumferential surface of the base portion and engages with a first engaged portion formed on an inner circumferential surface of the fitting hole; a seal lip portion that elastically contacts an outer circumferential surface of the cylindrical member; and a handling portion formed between the base portion and the seal lip portion, protruding from one end side of the fitting hole.

According to the present invention, the elastically deformable seal member has a handling portion protruding from one end side of the fitting hole, and thereby, when the handling portion is pressed toward the other end side of the fitting hole, the handling portion elastically deforms such as to shrink inward in the radial direction, the engagement state between the first engaging portion and the first engaged portion of the base member is released, and it is thereby possible to easily remove off the seal member from the base member without using a tool. Accordingly, the work efficiency during removing the seal member is improved.

Further, the handling portion is preferably formed with a higher rigidity than a rigidity of the seal lip portion.

By this arrangement, as the handling portion is formed with a higher rigidity than a rigidity of the seal lip portion, a worker is prevented from making a mistake trying to carry out removing work by pressing the seal lip portion with a low rigidity, and it is thus possible to carry out a removing work by surely pressing the handling portion formed continuously from the base portion. Accordingly, as the handling portion is easy to elastically deform inward in the radial direction if the worker presses the handling portion toward the other end side of the spark plug fitting hole, removing work and attaching work of the seal member can be easily carried out, and the seal member is prevented from being damaged during a work.

Further, as the support force for supporting the seal lip portion is increased by forming the handling portion with a higher rigidity than the rigidity of the seal lip portion, a sufficient pressure is applied by the seal lip portion to the cylindrical member, and sealing with airtightness and liquid tightness is ensured between the seal member and the cylindrical member.

Still further, arrangement is preferably made such that the seal member further includes a second engaging portion provided being recessed at a part of the outer circumferential surface of the base portion, the part being close to the handling portion, the second engaging portion having an outer circumferential diameter smaller than outer circumferential diameters of the first engaging portion and the handling portion, wherein the second engaging portion engages with a second engaged portion formed protruding inward in the radial direction from the inner circumferential surface of the fitting hole.

By this arrangement, in addition to the engagement between the first engaging portion of the seal member and the first engaged portion of the base member, the second engaging portion of the seal member and the second engaged portion of the base member engage with each other. Accordingly, the holding force (fixing force) holding the seal member at the base member can be further improved. Further, as the seal member is ensured to be held at the base member by further improvement in the holding force, it is further prevented that foreign matters, oil, and moisture enter between the seal member and the base member, and sealing failure caused by entrance of foreign matters and the like can be prevented.

The outer circumferential diameter of the second engaging portion is smaller than the outer circumferential diameters of the first engaging portion and the handling portion, and the second engaging portion is formed by recessing a part of the base portion, the part being close to the handling portion, and a part with a thin thickness is thus provided in the vicinity of the handling portion. Thus, even if a force pressing the handling portion is comparatively weak, the handling portion can be elastically deformed, and the work efficiency in removing the seal member is further improved.

Further, in order to solve the above-described problems, according to the invention, provided is a plug tube seal structure for an engine, including: a cylinder head cover that is attached to an upper portion of a cylinder head and provided with a spark plug fitting hole; a plug tube that is inserted in the spark plug fitting hole and houses a spark plug therein; and an elastically deformable seal member that is fitted to the spark plug fitting hole and disposed between the cylinder head cover and the plug tube, wherein the cylinder head cover includes: a first engaged portion provided being recessed on an inner circumferential surface of the spark plug fitting hole; and a second engaged portion that is formed protruding inward in a radial direction from the inner circumferential surface of the spark plug fitting hole, and has an inner circumferential diameter smaller than an inner circumferential diameter of the first engaged portion, wherein the seal member includes: a base portion inserted in the spark plug fitting hole; a first engaging portion that is formed protruding outward in a radial direction from an outer circumferential surface of the base portion, and engages with the first engaged portion; a seal lip portion that elastically contacts with an outer circumferential surface of the plug tube; a handling portion that is formed between the base portion and the seal lip portion, protruding downward from the spark plug fitting hole, and formed with a higher rigidity than a rigidity of the seal lip portion; and a second engaging portion that is provided being recessed at a part of the outer circumferential surface of the base portion, the part being close to the handling portion, has an outer circumferential diameter smaller than outer circumferential diameters of the first engaging portion and the handling portion, and engages with the second engaged portion.

According to the present invention, the elastically deformable seal member has a handling portion protruding downward from the spark plug fitting hole, and thereby, when the handling portion is pressed toward the upper side of the spark plug fitting hole, the handling portion elastically deforms such as to shrink inward in the radial direction, the engagement state between the first engaging portion and the first engaged portion of the cylinder head cover is released, and it is thereby possible to easily remove off the seal member from the cylinder head cover without using a tool. Accordingly, the work efficiency during removing the seal member is improved.

Still further, arrangement is preferably made such that the plug tube seal structure for an engine further includes: a cap member that contacts with an upper surface of the seal member, wherein the cylinder head cover further includes a third engaged portion formed at an upper marginal portion of the spark plug fitting hole and engaged by the cap member, and wherein the seal member is held being sandwiched and pressed between the cap member and the second engaged portion.

By providing the cap member in contact with the upper surface of the seal member, it is possible to inhibit foreign matters, oil, and moisture from entering the seal member from the upper side of the spark plug fitting hole, and sealing failure caused by entrance of foreign matters and the like can be reduced.

Further, as the seal member engages with the third engaged portion of the cylinder head cover and is pressure-sandwiched and held between the cap member and the second engaged portion of the cylinder head cover, the seal member is ensured to be held at the cylinder head cover, and sealing failure of the seal member during assembling can be reduced.

Yet further, arrangement is preferably made such that the cap member is an annular member formed with a higher rigidity than a rigidity of the seal member, and includes: a flange portion that is formed protruding outward in a radial direction from an outer circumferential surface of the cap member and is formed with an outer circumferential diameter larger than an inner circumferential diameter of the spark plug fitting hole; and a third engaging portion that engages with the third engaged portion, wherein the third engaging portion is formed by at least two extending portions that are extending outward in a radial direction from an outer circumferential surface of the flange portion and are provided at an interval therebetween along a circumferential direction of the flange portion, wherein the third engaged portion includes: an annular support surface that is extending along the upper marginal portion of the spark plug fitting hole and supports the extending portion from an under side; a circumferential wall portion formed extending upward from an outer circumferential end of the support surface; and at least two protruding portions provided protruding inward in a radial direction from an upper end of the circumferential wall portion, with an interval therebetween along a circumferential direction of the circumferential wall portion, and wherein the extending portions can be inserted between the support surface and the protruding portions.

By this arrangement, in attaching the cap member to the cylinder head cover, the extending portions are set to positions where the protruding portions are not present and made in contact with the support surface, and thereafter the cap member is rotated. Then, as the cap member can be attached to the cylinder head cover by inserting the extending portions between the support surface and the protruding portions, the work efficiency in attaching the cap member is improved.

On the other hand, in detaching the cap member from the cylinder head cover, the cap member can be detached from the cylinder head cover by lifting the cap member after rotating the cap member such as to move the extending portions to positions where the protruding portions are not present (positions between neighboring protruding portions), and the work efficiency in removing the cap member can thereby be improved. That is, as detaching and attaching work of the cap member can be carried out without using a tool, the maintainability is improved.

Further, arrangement is preferably made such that the cap member is an annular member formed with a higher rigidity than a rigidity of the seal member, and includes: a flange portion that is formed protruding outward in a radial direction from an outer circumferential surface of the cap member and is formed with an outer circumferential diameter larger than an inner circumferential diameter of the spark plug fitting hole; and a third engaging portion that engages with the third engaged portion, wherein the third engaging portion includes: at least two extending portions that are extending outward in a radial direction from an outer circumferential surface of the flange portion and are provided with an interval therebetween along a circumferential direction of the flange portion; and opening portions formed at the respective extending portions, wherein the third engaged portion is formed by at least two protruding portions provided protruding upward from an upper marginal portion of the spark plug fitting hole, with an interval therebetween along a circumferential direction of the spark plug fitting hole, and wherein the opening portions are arranged such as to enable insertion of the protruding portions.

By this arrangement, in attaching the cap member to the cylinder head cover, as the cap member can be attached to the cylinder head cover by inserting the protruding portions into the opening portions of the cap member, the work efficiency in attaching the cap member is improved.

On the other hand, in detaching the cap member from the cylinder head cover, the protruding portions are detached from the opening portions by lifting the cap member, and the cap member can be thus detached from the cylinder head cover. Accordingly, the work efficiency in removing the cap member is improved.

That is, as detaching and attaching work of the cap member can be carried out without using a tool, the maintainability is improved.

Still further, arrangement is preferably made such that the seal member further includes a cap seal portion formed protruding upward from an upper end of the base portion, wherein a lower surface of the flange portion is provided with a groove portion in a recessed shape opening downward in which the cap seal portion is inserted, and wherein the cap member is fixed to the cylinder head cover in a state that the cap seal portion is elastically deformed such as to be vertically shrunk.

By this arrangement, the cap seal portion of the seal member is inserted in the groove portion of the cap member in a state of elastic deformation such as to shrink in the vertical direction, and thereby sealing with airtightness and liquid tightness is made between the seal member and the cap member. Consequently, it is possible to prevent foreign matters, oil, and moisture from entering between the seal member and the cap member, and sealing failure caused by entrance of foreign matters and the like can be prevented.

Advantage of the Invention

According to the present invention, it is possible to provide a seal member and a plug tube seal structure for an engine, which improve the work efficiency in removing the seal member.

BRIEF DESCRIPTION OF THE DRAWINGS

FIGS. 4A and 4B illustrate the cylinder head cover, the seal member, and the cap member, wherein FIG. 4A is a partial enlarged perspective view showing a state that the cap member is detached, and FIG. 4B is a partial enlarged perspective view showing a state that the cap member is attached;

FIGS. 7A and 7B are illustrations of a cylinder head cover, a seal member, and a cap member in a first modified example, wherein FIG. 7A is a partial enlarged perspective view showing a state that the cap member is detached, and FIG. 7B is a partial enlarged perspective view showing a state that the cap member is attached;

FIGS. 8A to 8C are illustrations of a cylinder head cover, a seal member, and a cap member in a second modified example, wherein FIG. 8A is a partial enlarged perspective view showing a state that the cap member is detached, FIG. 8B is cross-sectional view taken along I-I line in FIG. 8A, and FIG. 8C is a partial enlarged vertical cross-sectional view showing a state that the cap member is attached; and FIGS. 9A and 9B are illustrations of a cylinder head cover, a seal member, and a cap member in a third modified example, wherein FIG. 9A is a partial enlarged perspective view showing a state that the cap member is detached, and FIG. 9B is a partial enlarged perspective view showing a state that the cap member is attached.

EMBODIMENTS FOR CARRYING OUT THE INVENTION

Figure 1:
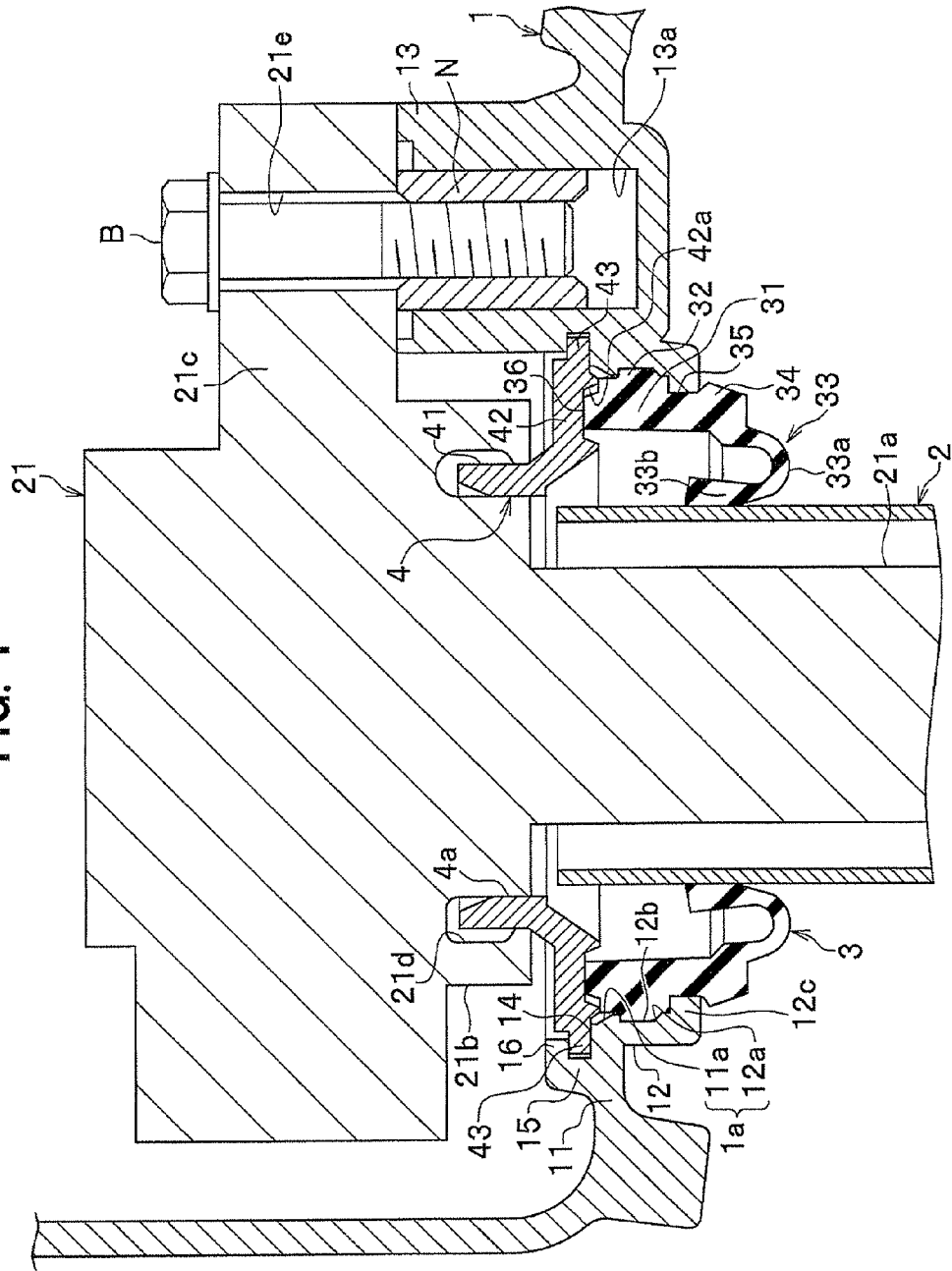
FIG. 1 is a vertical cross-sectional view of a plug tube seal structure for an engine of a vehicle, in an embodiment of the present invention.

Embodiments of the present invention will be described below in detail, referring to the drawings. In the description, the same symbols will be assigned to the respective same element, and overlapping description will be omitted.

Figures 2A, 2B, 2C:
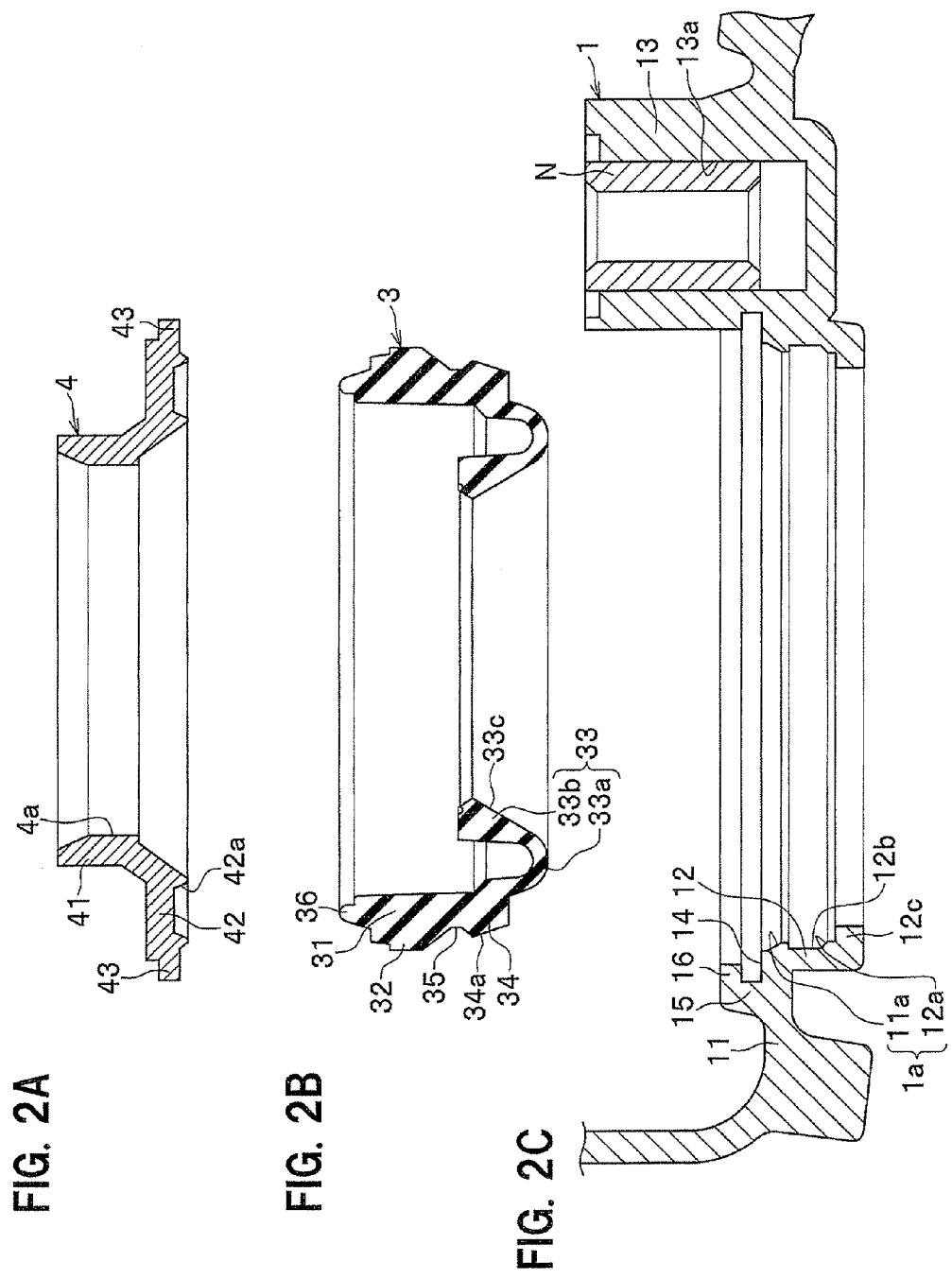
FIG. 2A is a vertical cross-sectional view of a cap member.
FIG. 2B is a vertical cross-sectional view of a seal member.
FIG. 2C is a vertical cross-sectional view of a cylinder head cover.

FIG. 1 is a vertical cross-sectional view of a plug tube seal structure for an engine of a vehicle, in an embodiment of the present invention. FIG. 2A is a vertical cross-sectional view of a cap member 4, FIG. 2B is a vertical cross-sectional view of a seal member 3, and FIG. 3C is a vertical cross-sectional view of a cylinder head cover 1.

As shown in FIG. 1, the cylinder head cover 1, which is a part of an engine, is provided with a spark plug fitting hole 1a that is in a circular shape penetrating in the vertical direction (plate thickness direction), wherein a plug tube 2 is inserted inside the spark plug fitting hole 1a. The seal member 3 is disposed between the cylinder head cover 1 and the plug tube 2, along the entire circumference of the spark plug fitting hole 1a, and the cap member 4 is disposed on the upper side of the seal member 3.

The cylinder head cover 1 as a base member is made from a synthetic resin and is attached to the top of a cylinder head, not shown. As shown in FIG. 1 and FIG. 2C, the upper wall 11 of the cylinder head cover 1 is provided with an opening portion 11a in a circular shape that is vertically (along axial direction) penetrating, and the lower marginal portion of the opening portion 11a is provided with a cylindrical fitting wall 12 extending downward by a certain length. The fitting wall 12 has a circular hole portion 12a formed continuously from the opening portion 11a. In the present embodiment, the spark plug fitting hole 1a is formed by the opening portion 11a of the upper wall 11 and the hole portion 12a of the fitting wall 12. Incidentally, a cylinder head cover 1 made from metal may be used.

A groove portion 12b is formed on the upper part of the inner circumferential surface of the fitting wall 12, being annularly recessed. A protruding portion 12c protruding inward in the radial direction by a certain length is formed on the lower part of the inner circumferential surface (in more detail, the inner circumferential surface on the lower side of the fitting wall 12) of the fitting wall 12.

The upper wall 11 of the cylinder head cover 1 is provided with a fastening portion 13 extending upward by a certain length, and the fastening portion 13 is formed continuously from a part of the outer circumferential surface of the fitting wall 12. The fastening portion 13 is provided with a bolt insertion hole 13a for insertion of a bolt B, and a nut N screw engaging with the bolt B is fixed to the inside of the bolt insertion hole 13a.

Figure 3:
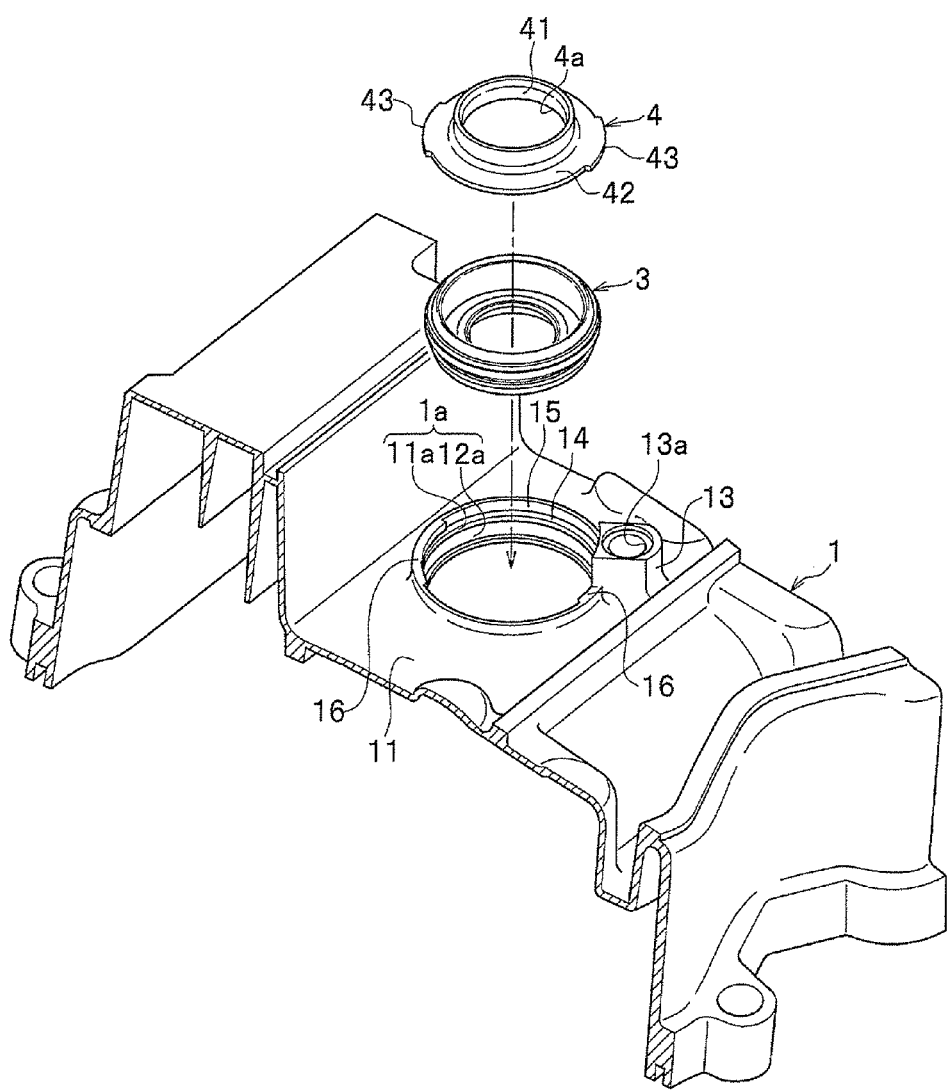
FIG. 3 is an exploded perspective view of the cylinder head cover, the seal member, and the cap member.
Figure 4A:
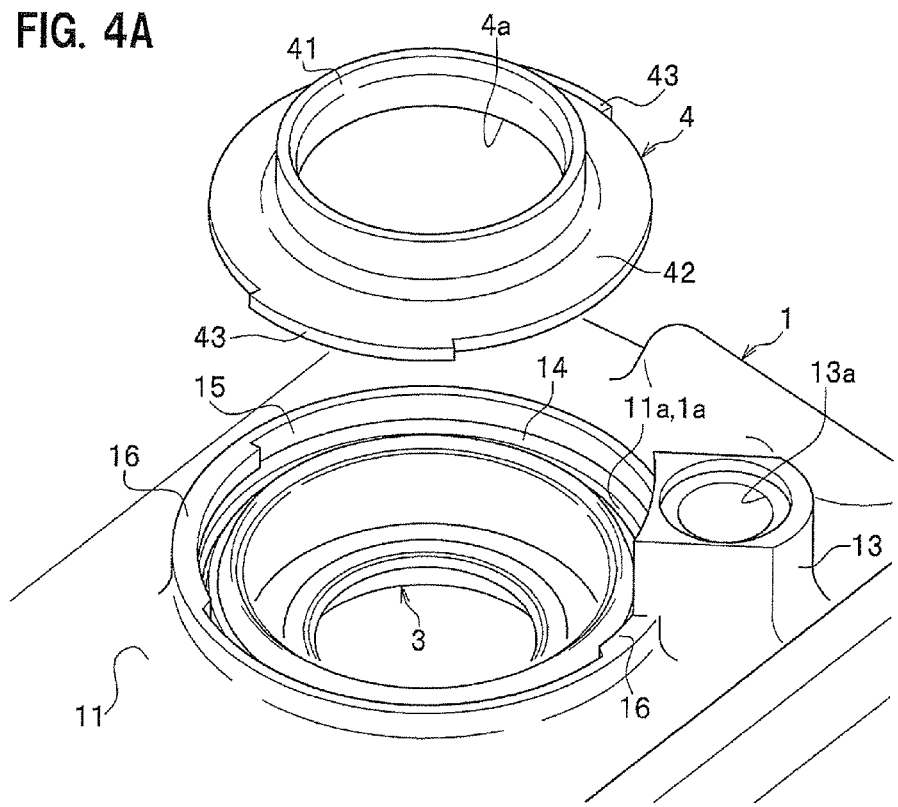
Figure 4B:
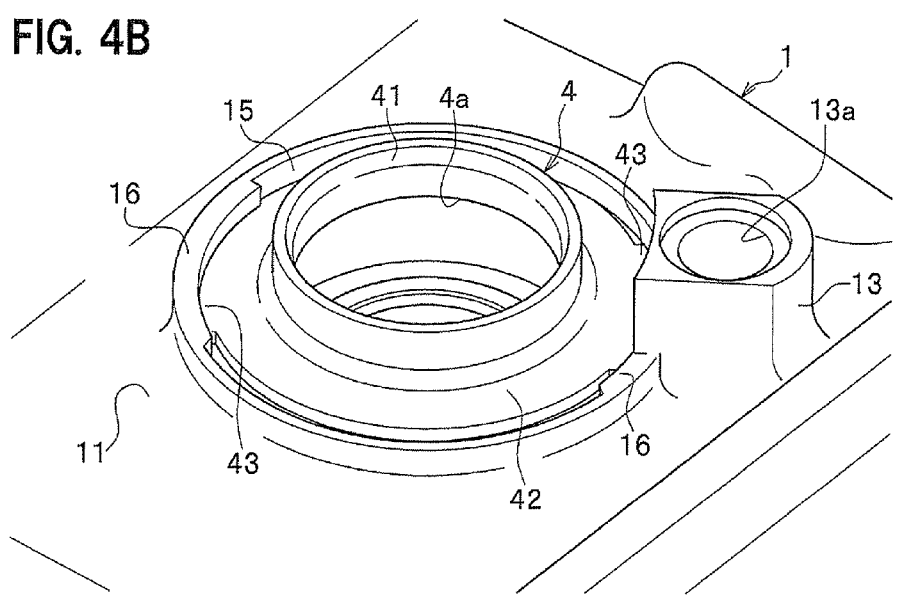

FIG. 3 is an exploded perspective view of the cylinder head cover 1, the seal member 3, and the cap member 4. FIGS. 4A and 4B illustrate the cylinder head cover 1, the seal member 3, and the cap member 4, wherein FIG. 4A is a partial enlarged perspective view showing a state that the cap member 4 is detached, and diagram 4B is a partial enlarged perspective view showing a state that the cap member 4 is attached.

As shown in FIG. 3 and FIGS. 4A and 4B, the upper marginal portion of the of the spark plug fitting hole 1a is provided with a support surface 14, a circumferential wall portion 15, and plural (two) protruding portions 16, 16.

The support surface 14 is an annular horizontal surface that supports the extending portion 43 of the later-described cap member 4 from the lower side in contact. The support surface 14 is extending along the upper marginal portion of the spark plug fitting hole 1a.

The circumferential wall portion 15 is a cylindrical wall portion formed extending upward from the outer circumferential end of the support surface 14 by a certain length. The circumferential wall portion 15 is provided standing from the support surface 14 such as to surround the upper marginal portion of the spark plug fitting hole 1a.

The protruding portions 16, 16 are protruding inward in the radial direction by a certain length from the upper part of the inner circumferential surface of the circumferential wall portion 15, and are provided with an equal interval along the circumferential direction of the circumferential wall portion 15. The protruding portions 16 are formed in a curved surface shape (arc shape) with a substantially same curvature as that of the circumferential wall portion 15.

In the present embodiment, the groove portion 12b corresponds to 'a first engaged portion' described in a claim; the protruding portion 12c corresponds to 'a second engaged portion' described in a claim; and the support surface 14, the circumferential wall portion 15, and the protruding portions 16 correspond to 'a third engaged portion' described in a claim.

Returning to FIG. 1, the plug tube 2 is a metal member in a cylindrical shape and is used, being appropriately selected from known plug tubes to be used. The upper portion (one end) of the plug tube 2 as a cylindrical member is inserted in the spark plug fitting hole 1a, and the lower portion (the other end) is fixed to a cylinder head, not shown. The upper portion of the plug tube 2 is fixed to the cylinder head cover 1 through the seal member 3. A part of a plug top coil 21 is attachably/detachably housed inside the upper side of the plug tube 2, and a spark plug, not shown, is attachably/detachably housed inside the lower side.

The plug top coil 21 has an axial portion 21a inserted inside the plug tube 2, a main body portion 21b formed with a larger diameter on the top of the axial portion 21a, and a flange portion 21c protruding outward in the radial direction by a certain length from the outer circumferential surface of the main body portion 21b. The lower surface of the main body portion 21b is provided with an annular groove portion 21d. The flange portion 21c is provided with a bolt insertion hole 21e to insert the bolt B. The plug top coil 21 is fixed to the upper surface of the cylinder head cover 1 by the bolt B inserted in the bolt insertion hole 21e and the bolt insertion hole 13a.

As shown in FIG. 1 and FIG. 2B, the seal member 3 is formed substantially in a cylindrical shape with openings at the upper and lower surfaces, and is formed from a material (for example, rubber) that is elastically deformable. As shown in FIG. 1, the seal member 3 is sandwiched between the inner circumferential surface of the spark plug fitting hole 1a and the outer circumferential surface of the plug tube 2, and is used to make sealing with airtightness and liquid tightness between the cylinder head cover 1 and the plug tube 2. The seal member 3 has a base portion 31, a protruding portion 32, a seal lip portion 33, a handling portion 34, a groove portion 35, and a cap seal portion 36 (see FIG. 2B.

The base portion 31 is an annular part inserted in the spark plug fitting hole 1a. The base portion 31 is extending along the vertical direction.

The protruding portion 32 is a part that engages with (fits to) the groove portion 12b. The protruding portion 32 is formed, protruding outward by a certain length in the radial direction from the outer circumferential surface of the upper portion of the base portion 31.

The seal lip portion 33 is a part that is in elastic contact (press-contact) with the outer circumferential surface of the plug tube 2 to make sealing with airtightness and liquid tightness between the seal member 3 and the plug tube 2. The seal lip portion 33 is extended inward in the radial direction from the lower end of the handling portion 34, and has a bent portion 33a bent such as to be convex downward, and a seal portion 33b extending upward from the end portion of the radially inner side of the bent portion 33a.

The seal portion 33b is a part that is distant inward in the radial direction by a certain length from the handling portion 34, and is an annular part through which the plug tube 2 is inserted. The seal portion 33b is, as shown in FIG. 2B, formed such that the thickness gradually becomes larger from the lower side to the upper side. The inner circumferential surface of the seal portion 33b is provided with a tapered surface 33c whose diameter gradually becomes smaller from the lower side to the upper side. The upper end of the seal portion 33b is a free end, as shown in FIG. 1, and the inner circumferential surface on the upper end side is in elastic contact with the outer circumferential surface of the plug tube 2. In the present embodiment, as the seal portion 33b presses the plug tube 2 by the urging force (elasticity) of the bent portion 33a, a sufficient pressure is applied to the plug tube 2, and sealing with airtightness and liquid tightness is ensured between the seal member 3 and the plug tube 2.

The handling portion 34 is a part that a worker presses in detaching/attaching the seal member 3 from/to the cylinder head cover 1. The handling portion 34 is formed between the base portion 31 and the seal lip portion 33, and is in a state of being protruding (exposed) downward from the spark plug fitting hole 1a. The handling portion 34 is formed such as to be thicker than the seal lip portion 33, and has a higher rigidity than the seal lip portion 33. The outer circumferential surface of the handling portion 34 is, as shown in FIG. 2B, provided with a tapered surface 34a whose diameter gradually becomes smaller from the upper side to the lower side. Thus, oil or moisture deposited on the handling portion 34 comes to easily fall by the own weight along the tapered surface 34a, and deterioration of the seal member 3 caused by deposition of oil or the like can be reduced.

Returning to FIG. 1, the groove portion 35 is an annular part that engages with (fits to) the protruding portion 12c of the cylinder head cover 1. The groove portion 35 is recessed, adjacent to the handling portion 34, on the outer circumferential surface of the base portion 31. The minimum outer circumferential diameter of the groove portion 35 is smaller than the maximum outer circumferential diameters of the protruding portion 32 and the handling portion 34.

The cap seal portion 36 is an annular part that is in elastic contact (press contact) with the lower surface of the cap member 4. The cap seal portion 36 is formed, protruding upward by a certain length from the upper end of the base portion 31, as shown in FIG. 2B. The cap seal portion 36 is elastically deformed such as to vertically shrink in a state that the cap member 4 is fixed to the cylinder head cover 1, as shown in FIG. 1. Thus, sealing with airtightness and liquid tightness is done between the seal member 3 and the cap member 4.

In the present embodiment, the protruding portion 32 corresponds to 'a first engaging portion' described in a claim, and the groove portion 35 corresponds to 'a second engaging portion' described in a claim.

The cap member 4 is a part that restricts vertical relative movement of the seal member 3 to prevent the seal member 3 from getting off from the upper side of the spark plug fitting hole 1a. The cap member 4 is in contact with the upper surface of the seal member 3, and is formed by a material (for example, a metal or a synthetic resin) with a higher rigidity than that of the material of the seal member 3. The cap member 4 is arranged to be attachable and detachable to/from the cylinder head cover 1.

The cap member 4 has, as shown in FIG. 4A, a circumferential wall portion 41, a flange portion 42, and plural (two) extending portions 43, 43.

The circumferential wall portion 41 is an annular wall portion extending along the vertical direction. The circumferential wall portion 41 is, as shown in FIG. 1, inserted in (fitting-engaged with) the groove portion 21d of the plug top coil 21, and is thus connected to the plug top coil 21.

As shown in FIG. 4A, the flange portion 42 is an annular portion formed protruding outward in the radial direction by a certain length from the outer circumferential surface of the lower portion of the circumferential wall portion 41. The outer circumferential diameter of the flange portion 42 is, as shown in FIG. 1, formed slightly larger than the inner circumferential diameter of the spark plug fitting hole 1a. The lower surface of the flange portion 42 is provided with an annular groove portion 42a recessed such as to be open downward, and the cap seal portion 36 of the seal member 3 is inserted in the groove portion 42a.

The extending portions 43 are parts that are inserted between the support surface 14 and the protruding portions 16 of the cylinder head cover 1. The extending portions 43 are formed protruding outward in the radial direction by a certain length from the outer circumferential surface of the flange portion 42, as shown in FIG. 4A, and are provided with an equal interval therebetween along the circumferential direction of the flange portion 42. The extending portion 43 is formed in a curved surface shape (arc shape) with a curvature substantially the same as those of the circumferential wall portion 15 and the protruding portions 16. The length of the extending portions 43 along the circumferential direction is formed to be smaller than the intervals between the neighboring protruding portions 16, 16, and to be substantially the same as the length of the protruding portions 16 along the circumferential direction.

Incidentally, the numbers of the extending portions 43 and the protruding portions 16 are not limited as long as being two at least. In the present embodiment, the extending portions 43 correspond to 'a third engaging portion' described in a claim.

The central portion of the cap member 4 is provided with an insertion hole 4a that is in a circular shape and is vertically penetrating. A part of the plug top coil 21 is inserted in the insertion hole 4a, as shown in FIG. 1, such as to fill in the insertion hole 4a. Thus, it is prevented that foreign matters or the like enter the seal member 3 from the insertion hole 4a of the cap member 4. The inner circumferential diameter of the insertion hole 4a is formed smaller than the inner circumferential diameter of the spark plug fitting hole 1a.

Incidentally, in the present embodiment, the groove portion 35 engages with the protruding portion 12c; the cap member 4 is in contact with the upper surface of the seal member 3; and the plug top coil 21 connected with the cap member 4 is fastened to the cylinder head cover 1 by the bolt B. Thereby, a sandwich-pressure holding structure for the seal member 3 can be obtained wherein the seal member 3 is held between the cap member 4 and the protruding portion 12c by a sandwiching pressure.

A plug tube seal structure for an engine in an embodiment according to the present invention is arranged basically as described above. In the following, detaching work and attaching work of the seal member 3 will be described, referring to FIGS. 5A to 5C, as appropriate.

Figure 5A:
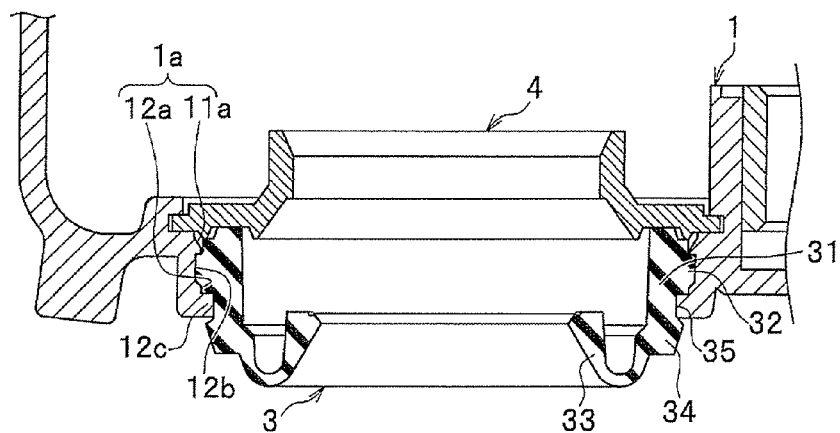
FIGS. 5A to 5C are vertical cross-sectional views for illustrating a process of removing the seal member.
Figure 5B:
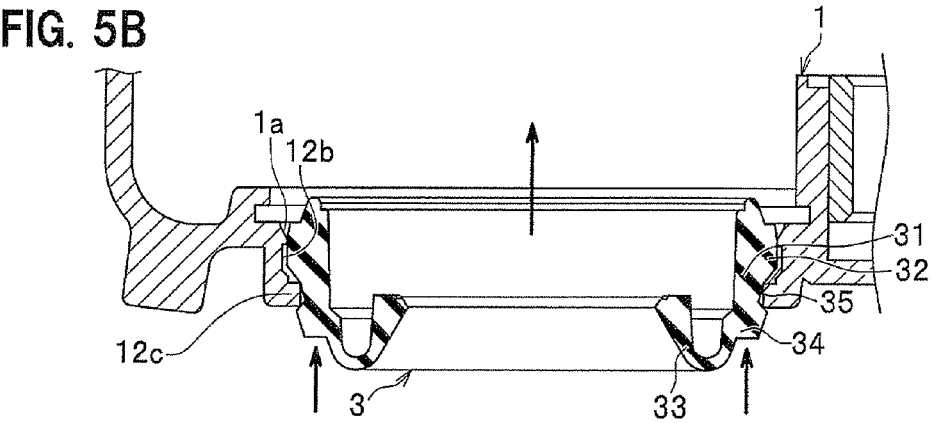
Figure 5C:
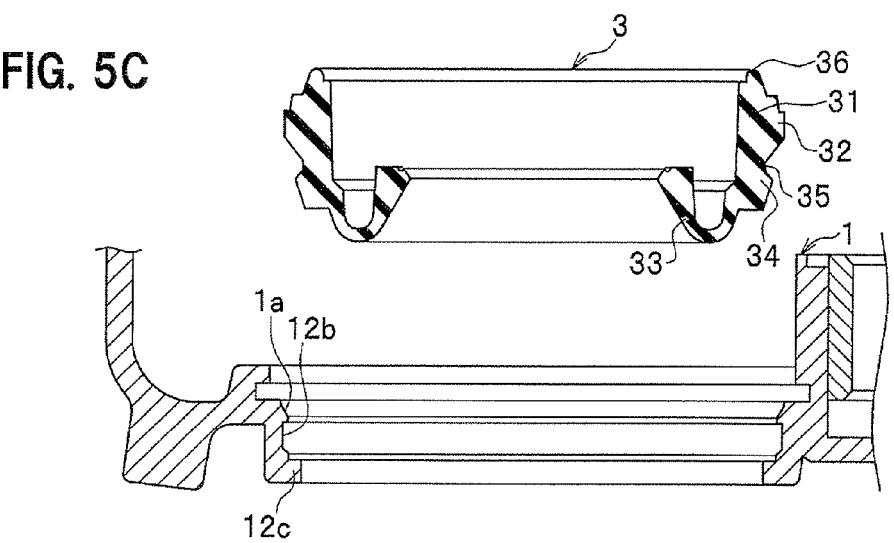

Incidentally, FIGS. 5A to 5C are vertical cross-sectional views for illustrating a process of removing the seal member 3.

Before detaching the seal member 3 from the cylinder head cover 1, as shown in FIGS. 5A and 5B, the bolt B is detached, the plug top coil 21 is thus detached from the cylinder head cover 1 in advance, and the cap member 4 is detached in advance. Further, the cylinder head cover 1 is detached from the cylinder head in advance.

Then, as shown in FIG. 5B, the handling portion 34 of the seal member 3 is pressed upward in the axial direction.

Herein, the handling portion 34 is elastically deformed such as to shrink inward in the radial direction so that the protruding portion 32 is detached from the groove portion 12b of the cylinder head cover 1, and the protruding portion 12c of the cylinder head cover 1 is detached from the groove portion 35. That is, the engagement state between the seal member 3 and the cylinder head cover 1 is released.

Subsequently, as shown in FIGS. 5B and 5C, the handling portion 34 is further pressed upward in the axial direction so that the seal member 3 is thereby moved to the upper side and thus the seal member 3 is detached from the cylinder head cover 1.

Incidentally, if a structure is arranged such that the seal member 3 is detached from the upper side of the spark plug fitting hole 1a in a state that the cylinder head cover 1 is attached to the cylinder head, in case that moisture or mud is deposited on the upper surface of the cylinder head cover 1, moisture or the like may enter the inside of the engine during the work of detaching the seal member 3. In this situation, in the present embodiment, a structure has been arranged as follows. That is, by making the handling portion 34 of the seal member 3 protrude from the lower side of the spark plug fitting hole 1a, it is made impossible to press the handling portion 34 and detach the seal member 3 unless the cylinder head cover 1 is detached from the cylinder head. Thus, in detaching the seal member 3, as the cylinder head cover 1 has been detached from the cylinder head without fail, it is possible to prevent that moisture or the like deposited on the upper surface of the cylinder head cover 1 enters the inside of an engine.

In the following, attaching work and detaching work of the cap member 4 will be described, referring to FIGS. 4A and 4B, as appropriate.

For attaching the cap member 4 to the cylinder head cover 1, the seal member 3 is to have been attached in advance to the cylinder head cover 1, as shown in FIG. 4A.

Then, the extending portions 43 are set to respective positions where the protruding portions 16 are not present, and made contact with the support surface 14 (see FIGS. 4A and 4B).

Subsequently, when the cap member 4 is rotated and the extending portions 43 are thus inserted between the support surface 14 and the protruding portions 16, the cap member 4 is attached to the cylinder head cover 1.

Incidentally, after attaching the seal member 3 and the cap member 4 to the cylinder head cover 1, the cylinder head cover 1 is attached to the cylinder head. At this moment, the upper side of the plug tube 2 attached to the cylinder head is inserted into the seal member 3 (seal lip portion 33) (see FIG. 1). Further, the axial portion 21a of the plug top coil 21 is inserted into the insertion hole 4a and the plug tube 2 from the upper side of the cap member 4, and then the flange portion 21c of the plug top coil 21 is fixed to the cylinder head cover 1 by the bolt B.

On the other hand, in detaching the cap member 4 from the cylinder head cover 1, the cap member 4 is rotated such that the extending portions 43 moves to respective positions where the protruding portions 16 are not present (see FIGS. 4A and 4B).

Then, when the cap member 4 is lifted up, the cap member 4 is detached from the cylinder head cover 1.

By the plug tube seal structure for an engine in the present embodiment described above, as the elastically deformable seal member 3 has the handling portion 34 protruding downward from the spark plug fitting hole 1a, when the handling portion 34 is pressed upward in the axial direction (toward the upper side of the spark plug fitting hole 1a), the handling portion 34 is elastically deformed such as to shrink inward in the radial direction; the engagement state between the protruding portion 32 and the groove portion 12b of the cylinder head cover 1 can be released; and the engagement state between the groove portion 35 and the protruding portion 12c of the cylinder head cover 1 can be released. Accordingly, the seal member 3 can be easily removed off from the cylinder head cover 1 without using a tool.

Consequently, the work efficiency in removing the seal member 3 is improved.

Further, as the handling portion 34 is formed with a higher rigidity than the rigidity of the seal lip portion 33, a worker is prevented from making a mistake trying to carry out removing work by pressing the seal lip portion 33 with a low rigidity, and it is thus possible to carry out a removing work by surely pressing the handling portion 34 formed continuously from the base portion 31. Accordingly, as the handling portion 34 is easy to elastically deform inward in the radial direction if the worker presses the handling portion 34 upward in the axial direction, removing work and attaching work of the seal member 3 can be easily carried out, and the seal member 3 is prevented from being damaged during a work.

Further, as the support force for supporting the seal lip portion 33 is increased by forming the handling portion 34 with a higher rigidity than the seal lip portion 33, a sufficient pressure is applied by the seal lip portion 33 to the plug tube 2, and sealing with airtightness and liquid tightness is ensured between the seal member 3 and the plug tube 2.

The outer circumferential diameter of the groove portion 35 is smaller than the outer circumferential diameters of the protruding portion 32 and the handling portion 34, the groove portion 35 is formed by recessing a part of the base portion 31, the part being close to the handling portion 34, and a part with a thin thickness is thus provided in the vicinity of the handling portion 34. Thus, even if a force pressing the handling portion 34 is comparatively weak, the handling portion 34 can be elastically deformed, and the work efficiency in removing the seal member 3 is further improved.

Still further, in addition to the engagement between the protruding portion 32 of the seal member 3 and the groove portion 12b of the cylinder head cover 1, the groove portion 35 of the seal member 3 and the protruding portion 12c of the cylinder head cover 1 engage with each other. Accordingly, the holding force (fixing force) holding the seal member 3 at the cylinder head cover 1 can be further improved. Further, as the seal member 3 can be surely held at the cylinder head cover 1 by further improvement in the holding force, it is further prevented that foreign matters, oil, and moisture enter between the seal member 3 and the cylinder head cover 1, and sealing failure caused by entrance of foreign matters and the like can be prevented.

Still further, by providing the cap member 4 in contact with the upper surface of the seal member 3 and providing the plug top coil 21 such as to fill in the insertion hole 4a of the cap member 4, it is possible to prevent foreign matters, oil, and moisture from entering the seal member 3 from the upper side of the spark plug fitting hole 1a, and sealing failure caused by entrance of foreign matters and the like can be prevented.

Yet further, the cap seal portion 36 of the seal member 3 is inserted in the groove portion 42a of the cap member 4 in a state of shrinking in the vertical direction, and thereby sealing with airtightness and liquid tightness is made between the seal member 3 and the cap member 4. Consequently, it is possible to prevent foreign matters, oil, and moisture from entering between the seal member 3 and the cap member 4, and sealing failure caused by entrance of foreign matters and the like can be prevented.

Further, as the seal member 3 is sandwiched and held between the cap member 4 and the protruding portion 12c of the cylinder head cover 1, the seal member 3 can be surely held at the cylinder head cover 1, and sealing failure of the seal member 3 during assembling can be reduced.

Still further, in attaching the cap member 4 to the cylinder head cover 1, the extending portions 43 are set to positions where the protruding portions 16 are not present and made in contact with the support surface 14, and thereafter the cap member 4 is rotated. Then, as the cap member 4 can be attached to the cylinder head cover 1 by inserting the extending portions 43 between the support surface 14 and the protruding portions 16, the work efficiency in attaching the cap member 4 is improved.

On the other hand, in detaching the cap member 4 from the cylinder head cover 1, the cap member 4 can be detached from the cylinder head cover 1 by lifting the cap member 4 after rotating the cap member 4 such as to move the extending portions 43 to positions where the protruding portions 16 are not present, and the work efficiency in removing the cap member 4 can thereby be improved.

That is, as detaching and attaching work of the cap member 4 can be carried out without using a tool, the maintainability is improved.

An embodiment according to the present invention has been described above in details with reference to the drawings, however, the invention is not limited thereto, and modifications and changes can be made, as appropriate, without departing from the spirit of the invention.

The present embodiment has been descried taking an example of an engine for a vehicle, however, it is needless to say that an internal combustion engine related to the present invention can be applied to an engine for a vessel, a general purpose machine, and the like other than vehicles.

Figure 6A:
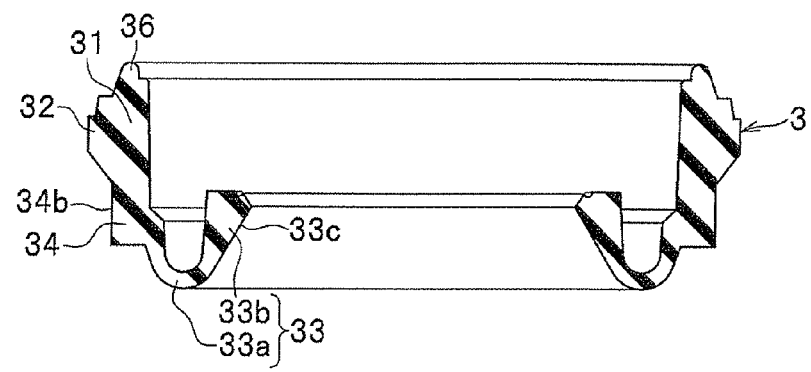
FIGS. 6A and 6B are vertical cross-sectional views showing modified examples of seal members.
Figure 6B:
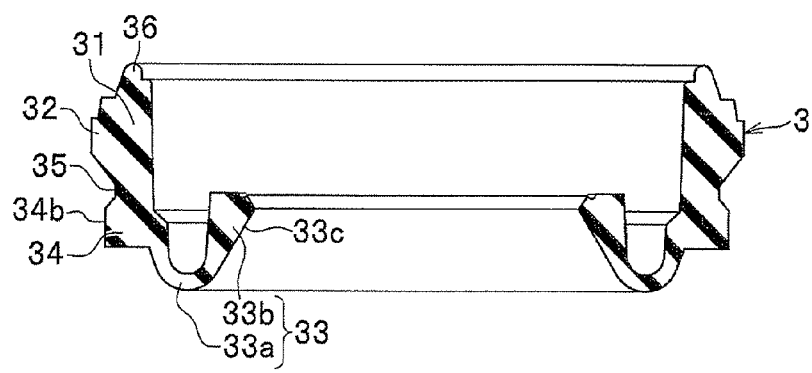

Further, in the present embodiment, the outer circumferential surface of the handling portion 34 is made as the tapered surface 34a whose diameter becomes gradually smaller from the upper side to the lower side, however, without being limited thereto, for example, the outer circumferential surface of the handling portion 34 may be made a vertical surface 34b formed with a constant outer diameter along the axial direction (along the vertical direction) as shown in FIGS. 6A and 6B.

In this case, as shown in FIG. 6A, arrangement may be made such that, omitting the groove portion 35, the outer circumferential surface of the handling portion 34 is extended to the lower part of the outer circumferential surface of the protruding portion 32 so that the outer circumferential surface of the handling portion 34 is an vertical surface 34b, or arrangement may be made such that, as shown in FIG. 6B, the outer circumferential surface of the handling portion 34 is a vertical surface 34b while the groove portion 35 is provided. Also with such an arrangement, as oil or moisture deposed on the handling portion 34 becomes easier to fall along the vertical surface 34b by the own gravity, deterioration of the seal member 3 caused by deposition of oil or the like can be reduced.

Further, as shown in FIG. 7, the structure of the cylinder head cover 1 and the cap member 4 may be modified. Incidentally, the following description will be made in details on differences from the foregoing embodiment, the same symbols will be assigned to the respective same elements as those in the foregoing embodiment, and overlapping description will be omitted.

Figure 7A:
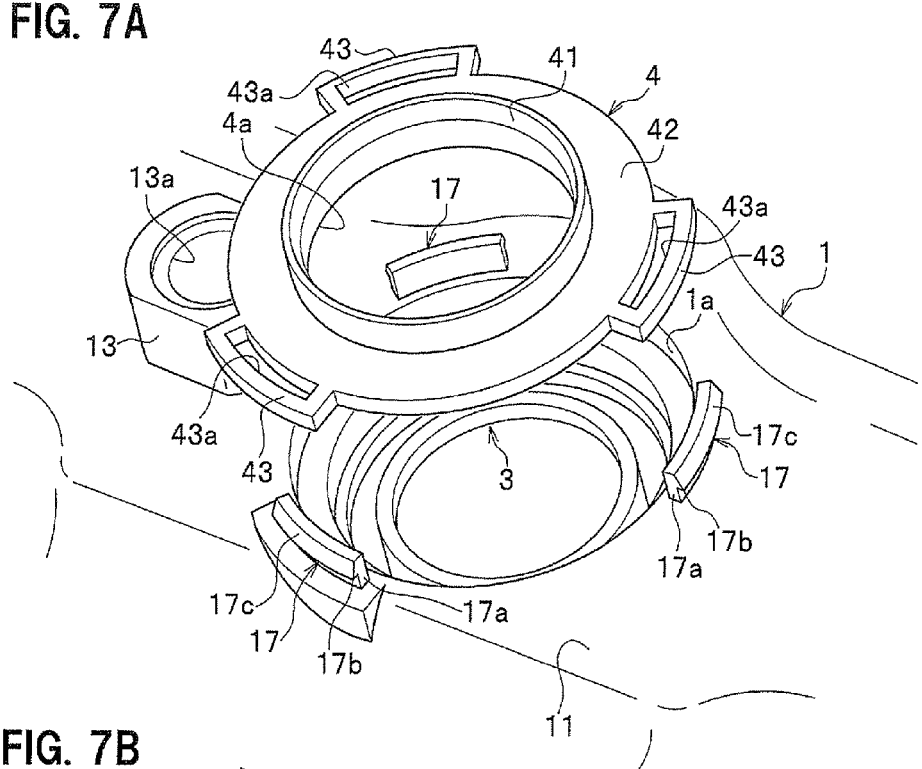
Figure 7B:
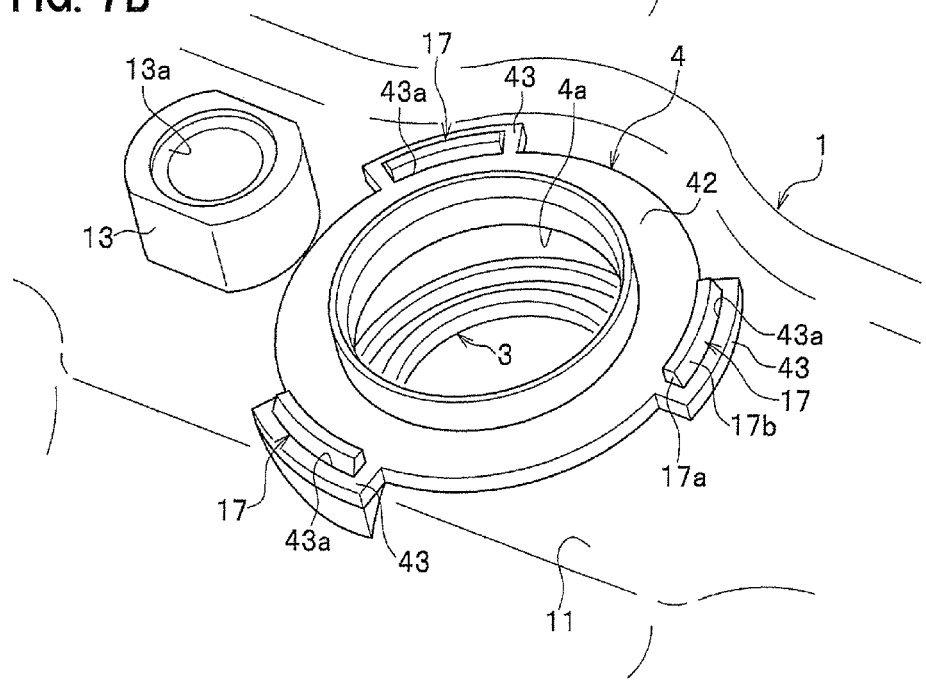

Regarding referential drawings, FIGS. 7A and 7B are illustrations of a cylinder head cover 1, a seal member 3, and a cap member 4 in a first modified example, wherein FIG. 7A is a partial enlarged perspective view showing a state that the cap member 4 is detached, and FIG. 7B is a partial enlarged perspective view showing a state that the cap member 4 is attached.

The first modified example is different from the foregoing embodiment in that plural (three) protruding portions 17, 17, . . . are provided protruding upward from the upper marginal portion of the spark plug fitting hole 1a by a certain length, and plural (three) extending portions 43, 43, . . . are respectively provided with opening portions 43a.

The protruding portions 17 are formed in a curved surface shape with substantially the same curvature as the curvature of the spark plug fitting hole 1a, and are provided with an equal interval along the circumferential direction of the spark plug fitting hole 1a.

Each protruding portion 17 is formed by a main body portion 17a protruding upward by a certain length from the upper surface of the upper wall 11, and a claw portion 17b extending outward in the radial direction from the outer circumferential surface of the upper portion of the main body portion 17a.

The claw portion 17b is a part that catches on (contacts) the upper surface of an extending portion 43 in a state that the protruding portion 17 is inserted through the opening portion 43a. The outer circumferential surface of the claw portion 17b is provided with a tapered surface 17c that is gradually inclined outward in the radial direction as going from the upper side toward the lower side.

The extending portions 43 are provided with an equal interval along the circumferential direction of the flange portion 42. Each extending portions 43 are provided with an opening portion 43a that is vertically penetrating. The opening portions 43a are formed in a shape matching with the protruding portions 17 and are arranged to enable insertion of the protruding portions 17. Incidentally, the numbers of the protruding portions 17 and the extending portions 43 are not limited as long as two or more.

In the present modified example, the extending portions 43 (opening portions 43a) correspond to 'a third engaging portion' described in a claim, and the protruding portions 17 correspond to 'a third engaged portion' described in a claim.

Incidentally, in attaching the cap member 4 to the cylinder head cover 1, when the opening portions 43a of the extending portions 43 are inserted into the protruding portions 17, the inner surfaces of the opening portions 43a and the claw portions 17b of the protruding portions 17 come in contact with each other, and the claw portions 17b are elastically deformed inward such as to shrink in the radial direction by pushing the extending portions 43.

Then, when the opening portions 43a have got down over the claw portions 17b, the claw portions 17b return to the original state; the claw portions 17b catches on the upper surfaces of the extending portions 43; and the lower sides of the main body portions 17a are inserted into the opening portions 43a. Thus, the cap member 4 is attached to the cylinder head cover 1.

On the other hand, in detaching the cap member 4 from the cylinder head cover 1, by lifting the cap member 4 while elastically deforming the claw portions 17b, the protruding portions 17 are detached from the opening portions 43a, and the cap member 4 is detached from the cylinder head cover 1.

The work efficiency in detaching and attaching the cap member 4 is improved also in the present modified example. That is, as it is possible to carry out detaching and attaching work of the cap member 4 without using a tool, the maintainability is improved.

Figure 8A:
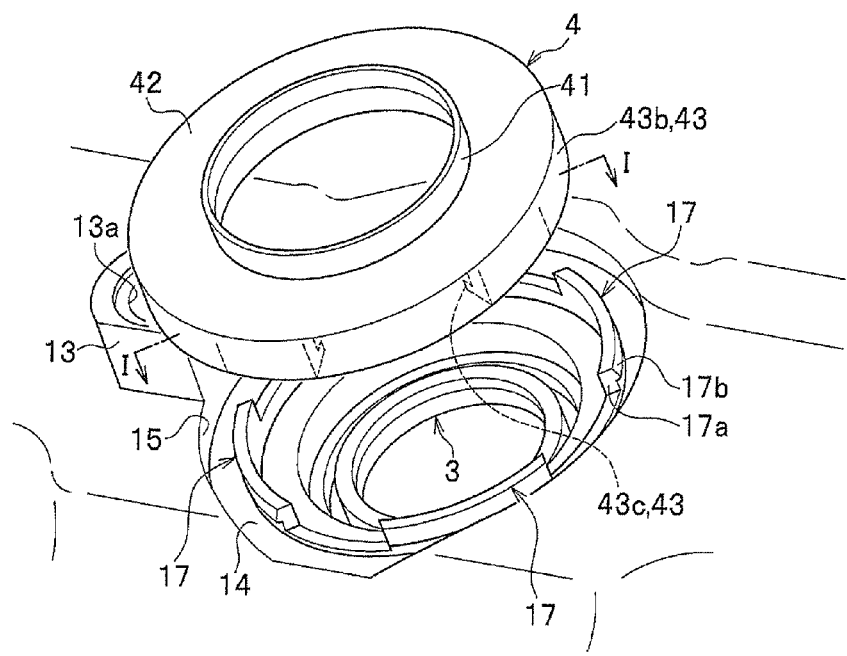
Figure 8B:
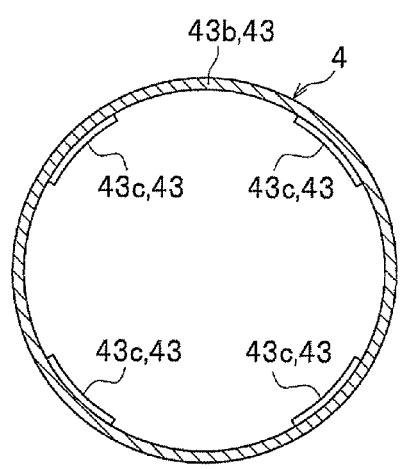
Figure 8C:
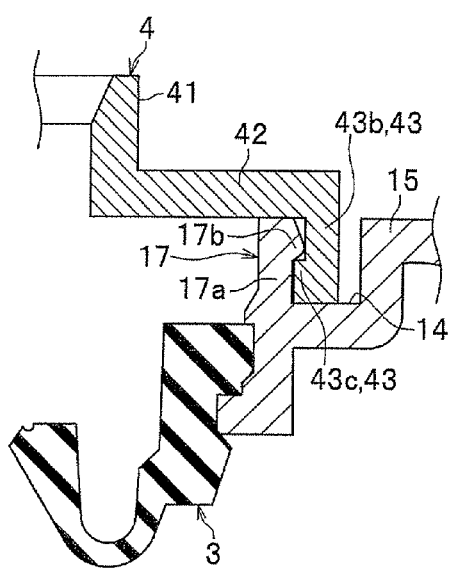

Further, the structure of the cylinder head cover 1 and the cap member 4 may be modified, as shown in FIGS. 8A to 8C. Incidentally, the following description will be made in details on differences from the first modified example, the same symbols will be assigned to the respective same elements as those in the first example, and overlapping description will be omitted.

Regarding referential drawings, FIGS. 8A to 8C are illustrations of a cylinder head cover 1, a seal member 3, and the cap member 4 in a second modified example, wherein FIG. 8A is a partial enlarged perspective view showing a state that the cap member is detached, FIG. 8B is cross-sectional view taken along I-I line in FIG. 8A, and FIG. 8C is a partial enlarged vertical cross-sectional view showing a state that the cap member 4 is attached.

As shown in FIG. 8A, the second modified example is different from the first modified example in that plural (four) protruding portions 17, 17, . . . are provided protruding upward by a certain length from the support surface 14 (only three are shown in FIG. 8A), and extending portions 43 are formed at the outer circumferential lower end of the flange portion 42.

As shown in FIG. 8C, an extending portion 43 is a part that is inserted between the circumferential wall portion 15 of the cylinder head cover 1 and the protruding portions 17.

The extending portion 43 is, as shown in FIGS. 8B and 8C, formed by an annular portion 43b extending downward by a certain length from the outer circumferential end of the flange portion 42, and plural (four) hook portions 43c, 43c that are extending inward by a certain length in the radial direction from the inner circumferential lower end of the annular portion 43b and are provided with an equal interval along the circumferential direction of the annular portion 43b.

The hook portions 43c are parts that are located on the lower side of the claw portions 17b in a state that the cap member 4 is fixed to the cylinder head cover 1, as shown in FIG. 8C. That is, in the present modified example, the hook portions 43c and the protruding portions 17 prevent the cap member 4 from getting off to the upper side from the cylinder head cover 1. The length of the hook portions 43c along the circumferential direction, as shown in FIG. 8A, smaller than the interval between the neighboring protruding portions 17, 17 and the length of the protruding portions 17 along the circumferential direction. Further, the interval between neighboring hook portions 43c, 43c is larger than the length of the protruding portions 17 along the circumferential direction.

In the present modified example, the extending portion 43 (hook portions 43c) corresponds to 'a third engaging portion' described in a claim, and the protruding portions 17 (the claw portions 17b) correspond to 'a third engaged portion' described in a claim.

Incidentally, in attaching the cap member 4 to the cylinder head cover 1, the hook portions 43c are set to positions, where the protruding portions 17 are not present, and are made contact with the support surface 14.

At this moment, parts, where the hook portions 43c are not formed, of the annular portion 43b are located between the circumferential wall portion 15 and the protruding portions 17.

Then, when the cap member 4 is rotated and the hook portions 43c of the extending portion 43 are thus inserted between the support surface 14 and the claw portions 17b of the protruding portions 17, the cap member 4 is attached to the cylinder head cover 1.

On the other hand, in detaching the cap member 4 from the cylinder head cover 1, the cap member 4 is rotated such that the hook portions 43c move to positions, where the protruding portions 17 are not present.

Then, when the cap member 4 is lifted, the cap member 4 is detached from the cylinder head cover 1.

Also in the present modified example, the work efficiency in detaching and attaching the cap member 4 is improved. That is, as detaching and attaching work of the cap member 4 can be carried out without using a tool, the maintainability is improved.

Figure 9A:
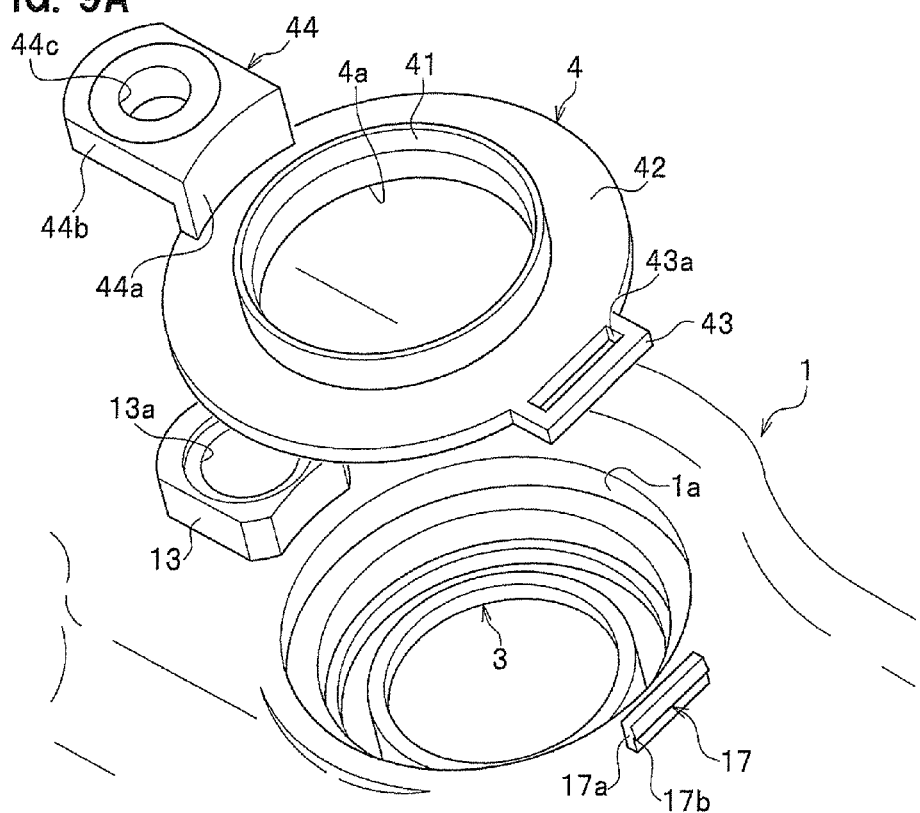
Figure 9B:
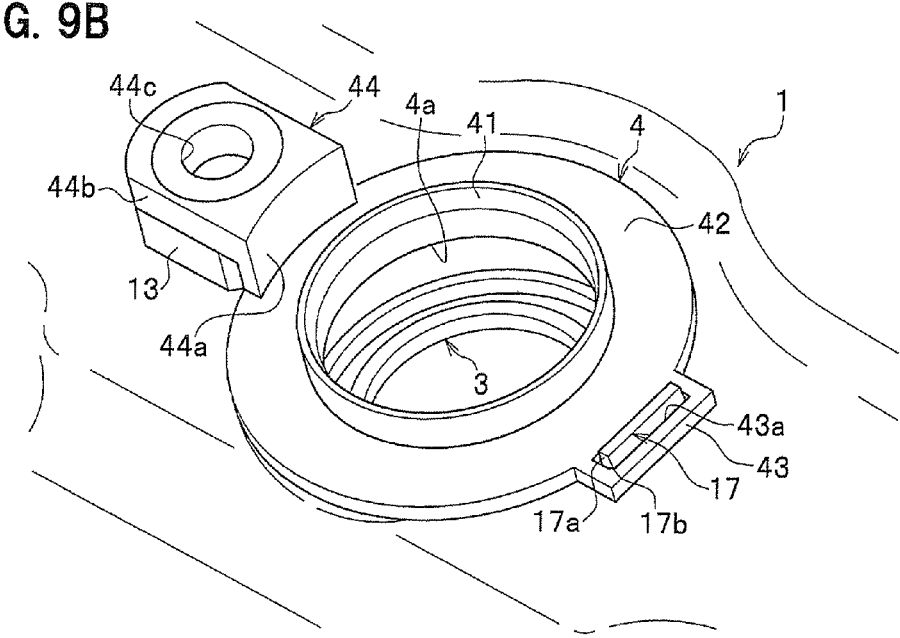

Further, the structure of the cylinder head cover 1 and the cap member 4 may be modified as shown in FIGS. 9A and 9B. Incidentally, the following description will be made in details on differences from the first modified example, the same symbols will be assigned to the respective same elements as those in the first example, and overlapping description will be omitted.

In the referential drawings, FIGS. 9A and 9B are illustrations of a cylinder head cover 1, a seal member 3, and a cap member 4 in a third modified example, wherein FIG. 9A is a partial enlarged perspective view showing a state that the cap member 4 is detached, and FIG. 9B is a partial enlarged perspective view showing a state that the cap member 4 is attached.

The third modified example is different from the foregoing first modified example in that a single protruding portion 17 is formed, protruding upward by a certain length from an upper marginal portion of the spark plug fitting hole 1a, a single extending portion 43 having an opening portion 43a is formed on the outer circumferential surface of a flange portion 42, and a fastening portion 44 is formed extending outward by a certain length in the radial direction from the outer margin of the upper surface of the flange portion 42.

The protruding portion 17 is linearly formed and disposed on the side opposite to a fastening portion 13 with the spark plug fitting hole 1a between them.

The extending portion 43 is formed substantially in a rectangular shape and has an opening portion 43a in a rectangular shape.

The fastening portion 44 is formed by a standup portion 44a in s curved surface shape protruding upward by a certain length from the upper surface of the flange portion 42 and a fitting portion 44b in a horizontal shape extending outward in the radial direction by a certain length from the outer surface of the upper end of the standup portion 44a. The fitting portion 44b is provided with a bolt insertion hole 44c penetrating through in the vertical direction. Incidentally, the flange portion 21c of the plug top coil 21 is disposed on the upper side of the fitting portion 44b (see FIG. 1).

In the present modified example, the cylinder head cover 1, the cap member 4, and the plug top coil 21 are integrally connected by inserting a bolt B through the bolt insertion hole 13a of the cylinder head cover 1, the bolt insertion hole 44c of the cap member 4, and the bolt insertion hole 21e of the plug top coil 21, and by screw-engaging the bolt B with a nut N. That is, the cap member 4 is fixed to the cylinder head cover 1, using fastening means for fastening the cylinder head cover 1 and the plug top coil 21.

In the present modified example, the extending portion 43 (the opening portion 43a) and the fastening portion 44 correspond to 'a third engaging portion' described in a claim, and the protrusion portion 17 and the fastening portion 13 correspond to 'a third engaged portion' described in a claim.

Incidentally, in attaching the cap member 4 to the cylinder head cover 1, when the protruding portion 17 is inserted into the opening portion 43a of the extending portion 43, the inner surface of the opening portion 43a and the claw portion 17b of the protruding portion 17 come in contact with each other, wherein the claw portion 17b is elastically deformed such as to shrink inward in the radial direction by pushing the extending portion 43.

Then, when the opening portion 43a has got down over the claw portion 17b, the claw portion 17b returns to the original state, the claw portion 17b catches on the upper surface of the extending portion 43, and the lower side of the main body portion 17a is inserted into the opening portion 43a.

Further, the bolt B is inserted through the bolt insertion hole 13a of the cylinder head cover 1, the bolt insertion hole 44c of the cap member 4, and the bolt insertion hole 21e of the plug top coil 21, and the bolt B is screw-engaged with the nut N.

Through the above-described process, the cap member 4 is attached to the cylinder head cover 1.

On the other hand, in detaching the cap member 4 from the cylinder head cover 1, the fastening state between the cylinder head cover 1, the cap member 4, and the plug top coil 21 is released by removing the bolt B.

Then, when the cap member 4 is lifted while elastically deforming the claw portion 17b, the protruding portion 17 is detached from the opening portion 43a, and the cap member 4 is detached from the cylinder head cover 1.

Also in the present modified example, the work efficiency in detaching and attaching the cap member 4 is improved.

DESCRIPTION OF REFERENCE SYMBOLS

1: cylinder head cover (base member)
1a: spark plug fitting hole
11a: opening portion
12a: hole portion
12b: groove portion (first engaged portion)
12c: protruding portion (second engaged portion)
13: fastening portion
14: support surface (third engaged portion)
15: circumferential wall portion (third engaged portion)
16, 17: protruding portion (third engaged portion)
2: plug tube (cylindrical member)
3: seal member
31: base portion
32: protruding portion (first engaging portion)
33: seal lip portion
34: handling portion 35: groove portion (second engaging portion)
36: cap seal portion
4: cap member
41: circumferential wall portion
42: flange portion
42a: groove portion
43: extending portion (third engaging portion)
43a: opening portion (third engaging portion)
B: bolt
N: nut

The invention claimed is:

1. A plug tube seal structure for an engine, comprising:
a cylinder head cover that is attached to an upper portion of a cylinder head and provided with a circular through-hole and a fitting wall, the fitting wall being an inner wall of the circular through-hole and extending downward toward the cylinder head;
a plug tube that is inserted in the circular through-hole and houses a spark plug therein;
an elastically deformable seal member that is fitted to an inner circumferential surface of the fitting wall and encircles the plug tube; and
a cap member that is attached to the cylinder head cover in a detachable manner and contacts with an upper surface of the elastically deformable seal member,
wherein the cylinder head cover includes:
a first engaged portion that is an annular recess formed concentric with the circular through-hole on the inner circumferential surface of the fitting wall;
a second engaged portion that is an annular protrusion formed concentric with the circular through-hole and protruding inward in a radial direction from the inner circumferential surface of the fitting wall, and has an inner diameter smaller than an inner diameter of the first engaged portion; and
a third engaged portion formed on an upper circumferential marginal portion of the circular through-hole, the cap member engaging the third engaged portion,
wherein the elastically deformable seal member includes:
a base portion that is formed in an annular shape extending in an axial direction thereof and encircling the plug tube inserted in the circular through-hole;
a first engaging portion that is an annular protrusion formed concentric with the base portion and protruding outward in a radial direction from the base portion, and engages with the first engaged portion;
a seal lip portion that is formed in an annular shape concentric with the base portion, and encircles and elastically contacts with an outer circumferential surface of the plug tube;
a handling portion that is formed in an annular shape concentric with the base portion between the base portion and the seal lip portion with a higher rigidity than a rigidity of the seal lip portion, the handling portion extending downward in an axial direction thereof from the base portion and projecting beyond a lower edge of the fitting wall; and
a second engaging portion that is an annular recess formed concentric with the base portion at a part of the outer circumferential surface of the base portion, the part being close to the handling portion, has an outer diameter smaller than outer diameters of the first engaging portion and the handling portion, and engages with the second engaged portion,
wherein the elastically deformable seal member is interposed and pressed between the cap member and the second engaged portion,
and wherein the elastically deformable seal member is removable from the cylinder head cover by detaching the cap member from the cylinder head cover and pressing the handling portion upward.

2. The plug tube seal structure for an engine according to claim 1,
wherein the cap member is an annular member formed with a higher rigidity than a rigidity of the seal member, and includes: a flange portion that is formed protruding outward in a radial direction from an outer circumferential surface of the cap member and is formed with an outer diameter larger than an inner diameter of the circular through-hole; and a third engaging portion that engages with the third engaged portion,
wherein the third engaging portion is formed by at least two extending portions that are extending outward in a radial direction from an outer circumferential surface of the flange portion and are provided with an interval therebetween along a circumferential direction of the flange portion,
wherein the third engaged portion includes:
an annular support surface that is extending along the upper circumferential marginal portion of the circular through-hole and supports the at least two extending portions from an under side;
a circumferential wall portion formed extending upward from an outer circumferential end of the annular support surface; and
at least two protruding portions provided protruding inward in a radial direction from an upper end of the circumferential wall portion, with an interval therebetween along a circumferential direction of the circumferential wall portion,
and wherein the at least two extending portions can be inserted between the annular support surface and the at least two protruding portions.

3. The plug tube seal structure for an engine according to claim 2,
wherein the elastically deformable seal member further includes a cap seal portion formed protruding upward from an upper end of the base portion,
wherein a lower surface of the flange portion is provided with a groove portion in a recessed shape opening downward in which the cap seal portion is inserted,
and wherein the cap member is fixed to the cylinder head cover in a state that the cap seal portion is elastically deformed such as to be vertically shrunk.

4. The plug tube seal structure for an engine according to claim 1,
wherein the cap member is an annular member formed with a higher rigidity than a rigidity of the seal member, and includes: a flange portion that is formed protruding outward in a radial direction from an outer circumferential surface of the cap member and is formed with an outer diameter larger than an inner diameter of the circular through hole; and a third engaging portion that engages with the third engaged portion,
wherein the third engaging portion includes:
at least two extending portions that are extending outward in a radial direction from an outer circumferential surface of the flange portion and are provided with an interval therebetween along a circumferential direction of the flange portion; and
opening portions formed at the respective at least two extending portions,
wherein the third engaged portion is formed by at least two protruding portions provided protruding upward from an upper circumferential marginal portion of the circular through-hole, with an interval therebetween along a circumferential direction of the circular through-hole, and wherein the opening portions are arranged such as to enable insertion of the at least two protruding portions.

5. The plug tube seal structure for an engine according to claim 1, wherein the fitting wall has, above an upper marginal edge of the first engaged portion, inner diameters larger than or equal to an inner diameter of the upper marginal edge of the first engaged portion.

6. The plug tube seal structure for an engine according to claim 5, wherein the cap member is an annular member formed with a higher rigidity than a rigidity of the seal member, and includes: a flange portion that is formed protruding outward in a radial direction from an outer circumferential surface of the cap member and is formed with an outer diameter larger than an inner diameter of the circular through-hole; and a third engaging portion that engages with the third engaged portion, wherein the third engaging portion is formed by at least two extending portions that are extending outward in a radial direction from an outer circumferential surface of the flange portion and are provided with an interval therebetween along a circumferential direction of the flange portion, wherein the third engaged portion includes:

an annular support surface that is extending along the upper circumferential marginal portion of the circular through-hole and supports the at least two extending portions from an under side;

a circumferential wall portion formed extending upward from an outer circumferential end of the annular support surface; and at least two protruding portions provided protruding inward in a radial direction from an upper end of the circumferential wall portion, with an interval therebetween along a circumferential direction of the circumferential wall portion, and wherein the at least two extending portions can be inserted between the annular support surface and the at least two protruding portions.

7. The plug tube seal structure for an engine according to claim 6, wherein the elastically deformable seal member further includes a cap seal portion formed protruding upward from an upper end of the base portion, wherein a lower surface of the flange portion is provided with a groove portion in a recessed shape opening downward in which the cap seal portion is inserted, and wherein the cap member is fixed to the cylinder head cover in a state that the cap seal portion is elastically deformed such as to be vertically shrunk.

8. The plug tube seal structure for an engine according to claim 5, wherein the cap member is an annular member formed with a higher rigidity than a rigidity of the seal member, and includes: a flange portion that is formed protruding outward in a radial direction from an outer circumferential surface of the cap member and is formed with an outer diameter larger than an inner diameter of the circular through hole; and a third engaging portion that engages with the third engaged portion, wherein the third engaging portion includes:

at least two extending portions that are extending outward in a radial direction from an outer circumferential surface of the flange portion and are provided with an interval therebetween along a circumferential direction of the flange portion; and opening portions formed at the respective at least two extending portions, wherein the third engaged portion is formed by at least two protruding portions provided protruding upward from an upper circumferential marginal portion of the circular through-hole, with an interval therebetween along a circumferential direction of the circular through-hole, and wherein the opening portions are arranged such as to enable insertion of the at least two protruding portions.

* * * * *